(12) United States Patent
Kempf et al.

(10) Patent No.: US 11,431,671 B2
(45) Date of Patent: Aug. 30, 2022

(54) METHOD AND APPARATUS FOR DYNAMIC DISCOVERY OF A BLOCKCHAIN COMPONENT IN A CLOUD COMPUTING SYSTEM

(71) Applicant: Telefonaktiebolaget LM Ericsson (publ), Stockholm (SE)

(72) Inventors: James Kempf, Mountain View, CA (US); Anshu Shukla, Bangalore (IN); Nanjangud Chandrasekhara Swamy Narendra, Bangalore (IN); Sambit Nayak, Bhubaneswar (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 16/956,666

(22) PCT Filed: Dec. 29, 2017

(86) PCT No.: PCT/IB2017/058529
§ 371 (c)(1),
(2) Date: Jun. 22, 2020

(87) PCT Pub. No.: WO2019/130051
PCT Pub. Date: Jul. 4, 2019

(65) Prior Publication Data
US 2020/0322308 A1 Oct. 8, 2020

(51) Int. Cl.
*H04L 61/5069* (2022.01)
*H04L 9/06* (2006.01)
(Continued)

(52) U.S. Cl.
CPC ........ *H04L 61/2069* (2013.01); *H04L 9/0637* (2013.01); *H04L 9/3236* (2013.01);
(Continued)

(58) Field of Classification Search
CPC ... H04L 9/0637; H04L 9/0643; H04L 9/0894; H04L 9/0825; H04L 63/0861; G06F 9/466; G06N 5/022; G06N 5/027
See application file for complete search history.

(56) References Cited

U.S. PATENT DOCUMENTS

| | | |
|---|---|---|
| 2010/0142410 A1 | 6/2010 | Van et al. |
| 2013/0247034 A1 | 9/2013 | Messerli |

(Continued)

FOREIGN PATENT DOCUMENTS

WO    2016057548 A1    4/2016

OTHER PUBLICATIONS

PCT International Search Report and Written Opinion dated Sep. 19, 2018 for International Application PCT/IB2017/058529, 10 pages.

(Continued)

*Primary Examiner* — Iqbal Zaidi
(74) *Attorney, Agent, or Firm* — Sage Patent Group (57) ABSTRACT

A method and a network device in a cloud computing system, including a first blockchain component that is one of a plurality of blockchain components forming a blockchain system, of dynamic discovery of another blockchain component of the blockchain system are described. A multicast address including a multicast group identifier is generated. The multicast group identifier is generated at least in part based on a genesis block identifier that uniquely identifies a blockchain serviced by the blockchain system. The network device joins a multicast group identified by the multicast group identifier; and transmits a message destined to the multicast address, where the message includes a request for a unicast address of another component of the blockchain system.

15 Claims, 8 Drawing Sheets

(51) Int. Cl.
  *H04L 9/32* (2006.01)
  *H04L 12/18* (2006.01)
  *H04L 61/5007* (2022.01)

(52) U.S. Cl.
  CPC ........ *H04L 12/185* (2013.01); *H04L 61/2007* (2013.01); *H04L 2209/38* (2013.01)

(56) References Cited

U.S. PATENT DOCUMENTS

2019/0199516 A1* 6/2019 Carver .................. H04L 9/3297
2020/0266989 A1* 8/2020 Krcmaricic-Barackov ................. H04W 12/06
2021/0266167 A1* 8/2021 Lohe ..................... H04L 9/3213

OTHER PUBLICATIONS

"Hyperledger Sawtooth documentation", 2 pages.
"Smart contract", 3 pages.
"Genesis block", 3 pages.
R. Rosenbaum,"Using the Domain Name System To Store Arbitrary String Attributes", RFC 1464, IETF, May 1993, 3 pages.
D. Eastlake et al.,"US Secure Hash Algorithms (SHA and SHA-based HMAC and HKDF)", RFC 6234, IETF, May 2011, 88 pages.
"IPv6 address", Wikipedia, 16 pages.
S. Deering et al.,"Multicast Listener Discovery Protocol", RFC 2710, IETF, Oct. 1999, 16 pages.
J. Veizades et al., "Service Location Protocol", RFC 2165, IETF, Jun. 1997, 50 pages.
"Universal Plug and Play"—Wikipedia, 11 pages.
B. Wellington, "Secure Domain Name System (DNS) Dynamic Update", RFC 3007, IETF, Nov. 2000, 7 pages.
"DDoS mitigation", 2 pages.
604C7ac, Apr. 21, 2016, XP055506514, 1 page.
604C7ac, Apr. 21, 2016, XP055506511, 2 pages.
Datastax, "Java Driver for Apache Cassandra—Address resolution", Aug. 29, 2018, XP055506558, 3 pages.

* cited by examiner

METHOD AND APPARATUS FOR DYNAMIC DISCOVERY OF A BLOCKCHAIN COMPONENT IN A CLOUD COMPUTING SYSTEM

CROSS-REFERENCE TO RELATED APPLICATIONS

This application is a 35 U.S.C. § 371 national stage application for International Application No. PCT/IB2017/058529, entitled "METHOD AND APPARATUS FOR DYNAMIC DISCOVERY OF A BLOCKCHAIN COMPONENT IN A CLOUD COMPUTING SYSTEM", filed on Dec. 29, 2017, the disclosures and contents of which are hereby incorporated by reference in their entireties.

TECHNICAL FIELD

Embodiments of the invention relate to the field of packet networking; and more specifically, to the dynamic discovery of a blockchain component in a cloud computing system.

BACKGROUND

A blockchain system is a platform used for building, running, and deploying a distributed ledger. The distributed ledger permanently records, and in a verifiable way, digital records of transactions that occur between two parties. The distributed ledger is maintained without a central authority or implementation. The distributed ledger is referred to as a blockchain that includes blocks, which are linked and secured using cryptography.

Typical implementations of blockchain systems include a collection of components (which will be referred to herein as blockchain components) that run as separate processes on the same or different servers. Each component may perform a different task and is operative to communicate and collaborate with the other components of the system. An exemplary implementation of a blockchain system includes a validation component, a Representational State Transfer (REST) Application Programming Interface (API) component, a transaction processing component. In this exemplary implementation, a validation component is operative to manage the data structures in the blockchain (that is stored on disk storage) and to conduct consensus with other validation components before including any blocks to the blockchain. The REST API component handles language independent operations from other blockchain components such as the transaction processing component and also from some client applications. The transaction processing component handles interaction between the blockchain system and client devices. For example, the transaction processing system may enforce certain format restrictions on the client interactions, or if the blockchain system supports smart contracts, the transaction processing system may run the language runtime system for the smart contract programming language.

In order for the blockchain system to provide a service to a client application, all components of the system need to be running. When the different components are implemented independently, (i.e., different processes running on the same or different network devices of a cloud computing system), they need to find one another in the network to communicate. For example, in packet-based networks, the components need to have the Internet Protocol (IP) address and port number (e.g., Transmission Control Protocol (TCP) port number) of the other components on which they depend, i.e., their dependees, in order to be able to reach these components.

Existing solutions for discovery of the different components of a blockchain system rely on hardcoding the IP addresses on each component. In these solutions, the addresses of the components are often supplied as command line arguments when the component is initialized.

Using command line arguments to specify which blockchain component another component of the blockchain should connect with is a brittle way to boot up the system. A mistake in entering the Uniform Resource Locator (URL) could result in a blockchain component from one application connecting to another blockchain component of another application. In addition, if the IP address of the blockchain component is dynamically allocated using Dynamic Host Configuration Protocol (DHCP), as is commonly the case, complex programmatic action may be required after the component boots in order to find the IP address. Hardcoding addresses into the command line precludes any automated startup of the blockchain components.

In addition, sequencing the startup of blockchain components, especially when they are run on separate servers, is impossible if the IP address and port number are hardcoded into the command line, because the IP address won't be known a priori before the server boots, at the time a system administrator would need to configure the startup script.

SUMMARY

One general aspect includes a method in a network device of a cloud computing system, including a first blockchain component that is one of a plurality of blockchain components forming a blockchain system, of dynamic discovery of another blockchain component of the blockchain system, the method including: generating a multicast address including a multicast group identifier that is generated at least in part based on a genesis block identifier that uniquely identifies a blockchain serviced by the blockchain system; joining a multicast group identified by the multicast group identifier; and transmitting a message destined to the multicast address, where the message includes a request for a unicast address of another component of the blockchain system.

One general aspect includes a network device in a cloud computing system, including a first blockchain component that is one of a plurality of blockchain components forming a blockchain system, for dynamic discovery of another blockchain component of the blockchain system, the network device including: a non-transitory computer readable medium to store instructions; a processor coupled with the non-transitory computer readable medium to process the stored instructions to generate a multicast address including a multicast group identifier that is generated at least in part based on a genesis block identifier that uniquely identifies a blockchain serviced by the blockchain system; join a multicast group identified by the multicast group identifier; and transmit a message destined to the multicast address, where the message includes a request for a unicast address of another component of the blockchain system.

One general aspect includes a non-transitory computer readable storage medium that provide instructions, which when executed by a processor of a network device in a cloud computing system, including a first blockchain component that is one of a plurality of blockchain components forming a blockchain system, cause said processor to perform operations including: generating a multicast address including a multicast group identifier that is generated at least in part based on a genesis block identifier that uniquely identifies a blockchain serviced by the blockchain system; joining a multicast group identified by the multicast group identifier; and transmitting a message destined to the multicast address, where the message includes a request for a unicast address of another component of the blockchain system.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for enabling dynamic discovery of blockchain components. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for dynamic discovery of blockchain system components are described. In some embodiments, the dynamic discovery of a blockchain component provides application specific service on an Internet Protocol (IP) network in a cloud computing data center. The embodiments described herein enable a blockchain component of the blockchain system to dynamically discover other components of the blockchain system. The embodiments described herein enable a blockchain component of a particular type in a blockchain system to discover if another instance of the same type is running. This allows the blockchain system to dynamically regulate the number of instances of a given blockchain component running in the system. In some embodiments, the mechanisms described herein allow components of a blockchain system to be added dynamically to the network of components forming the blockchain system without having their IP addresses statically preconfigured.

In some embodiments, a method and a network device in a cloud computing system, including a first blockchain component that is one of a plurality of blockchain components forming a blockchain system, of dynamic discovery of another blockchain component of the blockchain system are described. A multicast address including a multicast group identifier is generated. The multicast group identifier is generated at least in part based on a genesis block identifier that uniquely identifies a blockchain serviced by the blockchain system. The network device joins a multicast group identified by the multicast group identifier; and transmits a message destined to the multicast address, where the message includes a request for a unicast address of another component of the blockchain system.

Figure 1:
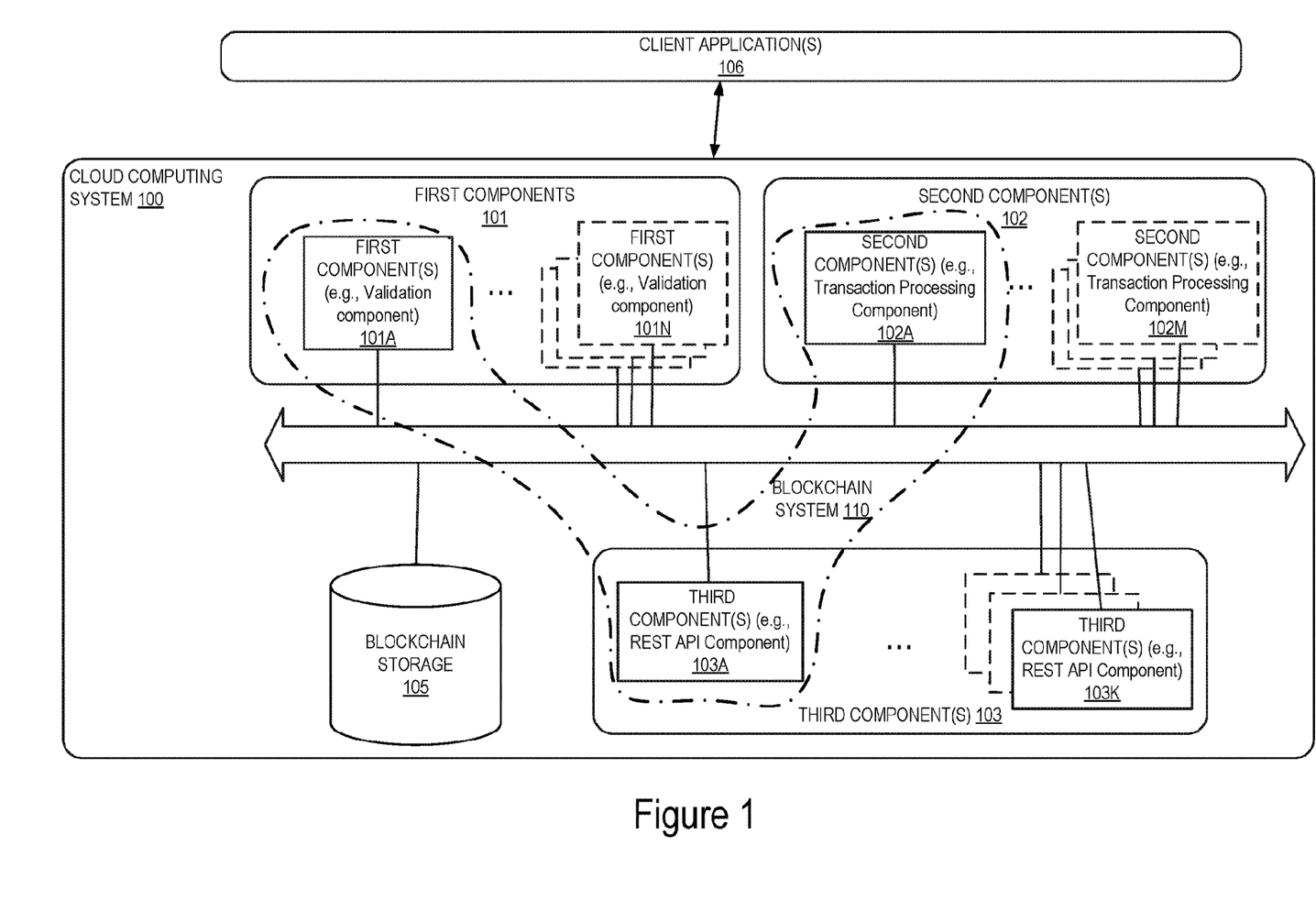
FIG. 1 illustrates a block diagram of an exemplary cloud computing system in which dynamic discovery of blockchain components is enabled, in accordance with some embodiments.

FIG. 1 illustrates a block diagram of an exemplary cloud computing system in which dynamic discovery of blockchain components of a blockchain system is enabled, in accordance with some embodiments. The cloud computing system 100 includes a set of one or more first component(s) 101A-101N, a set of one or more second component(s) 102A-102M, a set of one or more third component(s) 103A-103K, and a blockchain storage 105. The cloud computing system 100 is coupled with client application(s) 106. In some embodiments, the client applications can be part of the cloud computing system. Each component may run on one or more network devices forming the cloud computing system 100. In some embodiments, one or more components can run on a single network device of the cloud computing system 100. The blockchain storage 105 is a storage system used to store the blockchains for each of the client application(s) 106. In some embodiments, the blockchain storage 105 can be external to the cloud computing system 100.

The cloud computing system includes a blockchain system 110. The blockchain system 110 is a platform that allows one of the client applications 106 to build, run, and deploy a blockchain (i.e., distributed ledger). The cloud computing system 100 can have multiple blockchains serviced by multiple blockchain systems for different types of applications (of which blockchain system 110 is one example). For example, one blockchain may provide tenant management for the underlying cloud computing service. Another blockchain may supply third party service providers, such as streaming media service providers, with customer account management service. In another example, a blockchain may be under use for a production phase while another is being phased into deployment phase. In addition, the cloud computing system may include multiple blockchain implementations of the blockchain components. Several vendors may provide different implementations of validation components, transaction-processing components, and/or REST API components. These different implementations may all be part of the cloud computing system 100 accessible to one another over the network.

Each of the components 101A-101N is a component of a first type and is operative to perform a first set of one or more tasks from the tasks performed in the cloud computing system 100. For example, in some implementations, each one of the components 101A-101N is a validation component of a blockchain system. In this exemplary implementation, a validation component is operative to manage the data structures in the blockchain and to conduct consensus with other validation components before including any blocks to the blockchain. The first components can be implemented by one or more vendors. For example, in the illustrated exemplary implementation of FIG. 1, first component 101A can be part of a first set of components from a first vendor while first component 101N is part of another set that is provided by a second vendor.

Each of the components 102A-102M is a component of a second type and is operative to perform a second set of one or more tasks from the tasks performed in the cloud computing system 100. The second set of tasks is typically distinct from the first set of tasks performed by the components 101A-101N. For example, in some implementations, each one of the components 102A-102M is a transaction-processing component of a blockchain system. A transaction-processing component handles interaction between the blockchain system to which it belongs and client application(s) 106. For example, the transaction-processing component may enforce certain format restrictions on the client interactions, or if the blockchain system supports smart contracts, the transaction-processing component may run the language runtime system for the smart contract programming language. The second components can be implemented by one or more vendors. For example, in the illustrated exemplary implementation of FIG. 1, second component 102A can be part of a first set of components from a first vendor while first component 102M is part of another set that is provided by a second vendor.

Each of the components 103A-103K is a component of a third type and is operative to perform a third set of one or more tasks from the tasks performed in the cloud computing system 100. The third set of tasks is typically distinct from the first set of tasks performed by the first components 101A-101N and from the second set of tasks performed by the second components 102A-102M. For example, in some implementations, each one of the components 103A-103K is a REST API component of a blockchain system. The REST API component handles language independent operations from other blockchain components such as the transaction-processing component and from some client operations. The third components can be implemented by one or more vendors. For example, in the illustrated exemplary implementation of FIG. 1, first component 103A can be part of a first set of components from a first vendor while first component 103K is part of another set that is provided by a second vendor.

While the embodiments herein will be described with the blockchain system including validation components, REST API components, and transaction processing components, in other embodiments, different subdivision of the tasks performed in the blockchain system can be contemplated. For example, a transaction-processing component can be implemented in combination with a validation component and run as a single process in the cloud computing system 100. Other combinations of tasks and/or other/additional tasks can be done without departing from the scope of the current invention.

The first component 101A, the second component 102A and the third component 103A are used to deploy a blockchain for one of the client applications 106. The three components run in collaboration and use the blockchain storage 105 to store the blocks of the blockchain. The three components are part of the same blockchain system 110. As it will be described in further details below with reference to FIGS. 2-6B, the three components are part of a multicast group associated with a multicast group identifier that enables the three components to discover one another in the cloud computing system 100. Each of the first component 101A, the second component 102A, and the third component 103A generates a multicast address based on the multicast group and joins the multicast group. Each component may transmit a message addressed to the multicast address requesting an IP address of each one of the receiving components. This enables a blockchain component to find other blockchain component from the same blockchain system in the networked cloud computing system 100 and obtain their respective IP address. Obtaining the IP address of a component allows each one of the other components to establish communication with the other components of the same blockchain system based on this address.

The multicast address includes a multicast group identifier that uniquely identifies the multicast group. The multicast group identifier is generated at least in part based on a genesis block identifier of the blockchain. In some embodiments, the multicast address is an IPv6 address. In some embodiments, when several components of the same type are used to implement the same blockchain (e.g., if the first component 101A and 101N are part of the same blockchain), the multicast address can be used by a component to determine whether another component of the same type is already running as part of the blockchain system. This enables the blockchain system to regulate the number of components used and available for providing a service. The embodiments described herein enable a blockchain system to dynamically configure its components rather than having to be statically configured through command line arguments.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
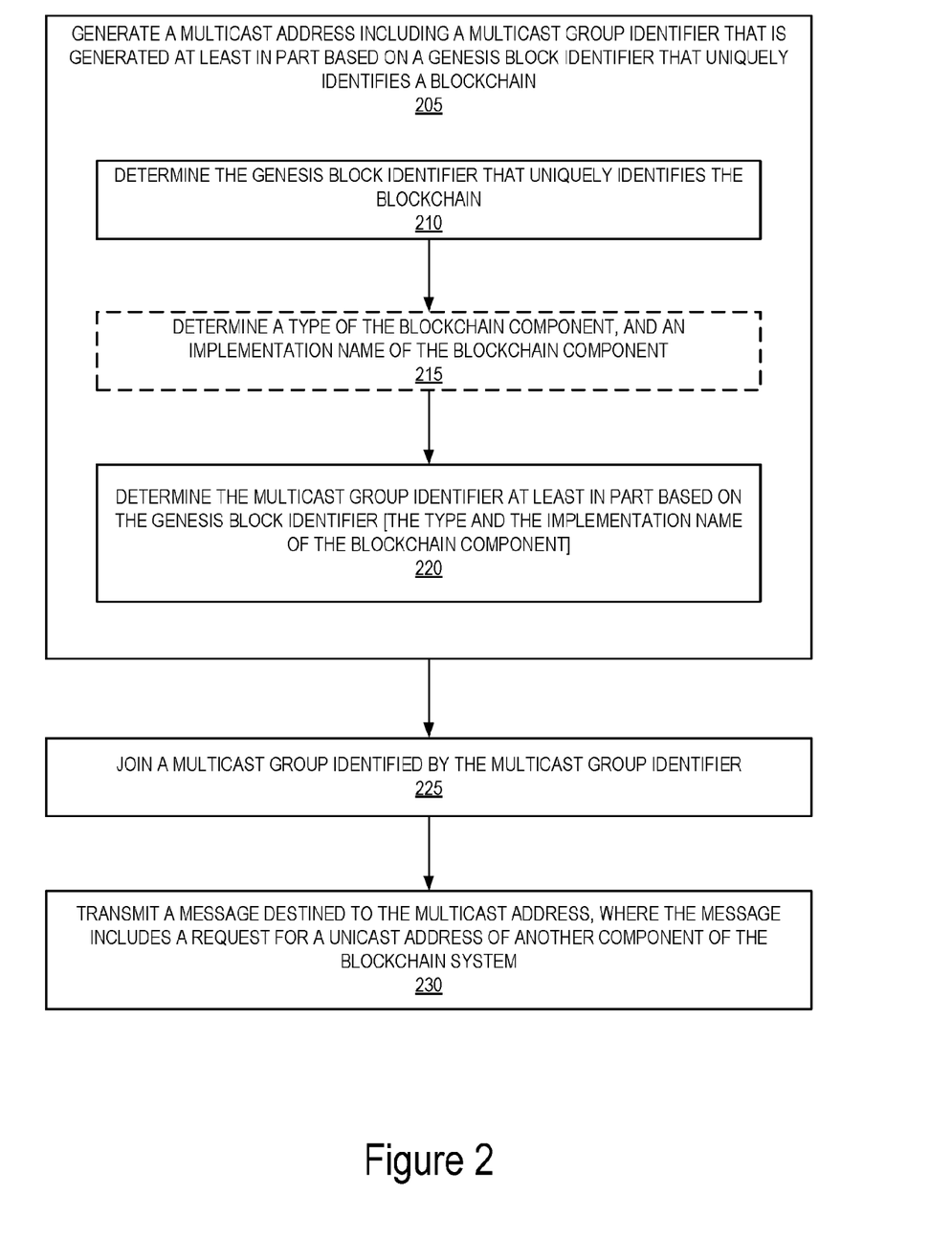
FIG. 2 illustrates a flow diagram of exemplary operations for enabling dynamic discovery of blockchain components of a blockchain system in a cloud-computing system, in accordance with some embodiments.

FIG. 2 illustrates a flow diagram of exemplary operations for enabling dynamic discovery of blockchain components in a cloud-computing system, in accordance with some embodiments. The operations of the flow diagram are performed in a blockchain component from the cloud computing system 100. For example, the operations can be performed by one of the first components (validation components) 101, one of the second components (transaction processing components) 102, or one of the third components (REST API component) 103. In the illustrated example, the first component 101A, the second component 102A, and the third component 103A instantiate a blockchain system 110 that provide a blockchain service to one of the client applications 106. In the discussion below, this blockchain will be used to discuss the operations of the different components. The resulting blockchain is stored in the blockchain storage 105 and includes one or more blocks that are cryptographically linked. The blockchain includes a genesis block that is the first block in the blockchain. Every block in the blockchain has a parent block, except the genesis block, which has no parent block. The genesis block is identified with a unique identifier. This unique identifier is also a unique identifier of the blockchain itself.

At operation 205, the blockchain component generates a multicast address including a multicast group identifier that is generated at least in part based on a genesis block identifier that uniquely identifies the blockchain serviced by the blockchain system. When a blockchain is serviced by the blockchain system, the different components forming the blockchain system when executed build, run, and deploy the blockchain. In some embodiments, determining the multicast address includes operations 210, 220 and optional operation 215.

At operation 210, the blockchain component determines the genesis block identifier. Several mechanisms can be used to determine the genesis block identifier. In some embodiments, the genesis block identifier is hardcoded into the applications that utilize its blockchain.

In another embodiment, the genesis block identifier can be obtained via a Domain Name System (DNS) Text (TXT) record. A TXT record is a type of resource record stored in the DNS server and used to provide the ability to associate an arbitrary and unformatted text with a host or other name, such as human readable information about a server, network, data center, and other accounting information. The TXT record is used to store the genesis block identifier of the blockchain. In some of these embodiments, the DNS system may limit the size of TXT resource records to m bits; the genesis block identifier can be truncated by dropping n bits.

In some embodiments, to avoid a blockchain component from being spoofed by a rogue DNS server, DNS Security Extension (DNSSec) is deployed in the cloud computing system 100 to ensure that each blockchain component of the cloud computing system 100 can authenticate the record including the genesis block identifier when that blockchain component receives the record.

In other embodiments, the genesis block identifier can be put on the command line of boot up of a blockchain component. In another example, the genesis block identification can be advertised to the blockchain component by a standardized service discovery solution. Several other mechanisms can be used to enable a blockchain component to determine the identifier of the genesis block of the blockchain that the blockchain component is implementing.

In some embodiments, the flow of operations moves from operation 210 to operation 215, at which the blockchain component determines a type of the blockchain component and an implementation name of the blockchain component. The type of the blockchain component identifies the type of operations performed by this blockchain component. For example, in some implementations, a blockchain component can be any one of a validation component, a transaction-processing component, or a REST API component. In other types of implementations, the blockchain system may include other types of components that are identified with other names without departing from the scope of the present invention. The implementation name refers to the name of the deployment type for the blockchain component. For example, the implementation name can be a name of a vendor, or a product that is used to implement the blockchain component. The type of the component and the implementation name are statically determined when the program code of the blockchain component is written. Typically, these types/names are written directly into the program code.

The flow of operations moves from operation 215 to operation 220, at which the blockchain component determines the multicast group identifier at least in part based on the genesis block identifier. In some embodiments, the determination of the multicast group identifier is further performed based on the type of the blockchain component and the implementation name of the blockchain component.

Figure 3:
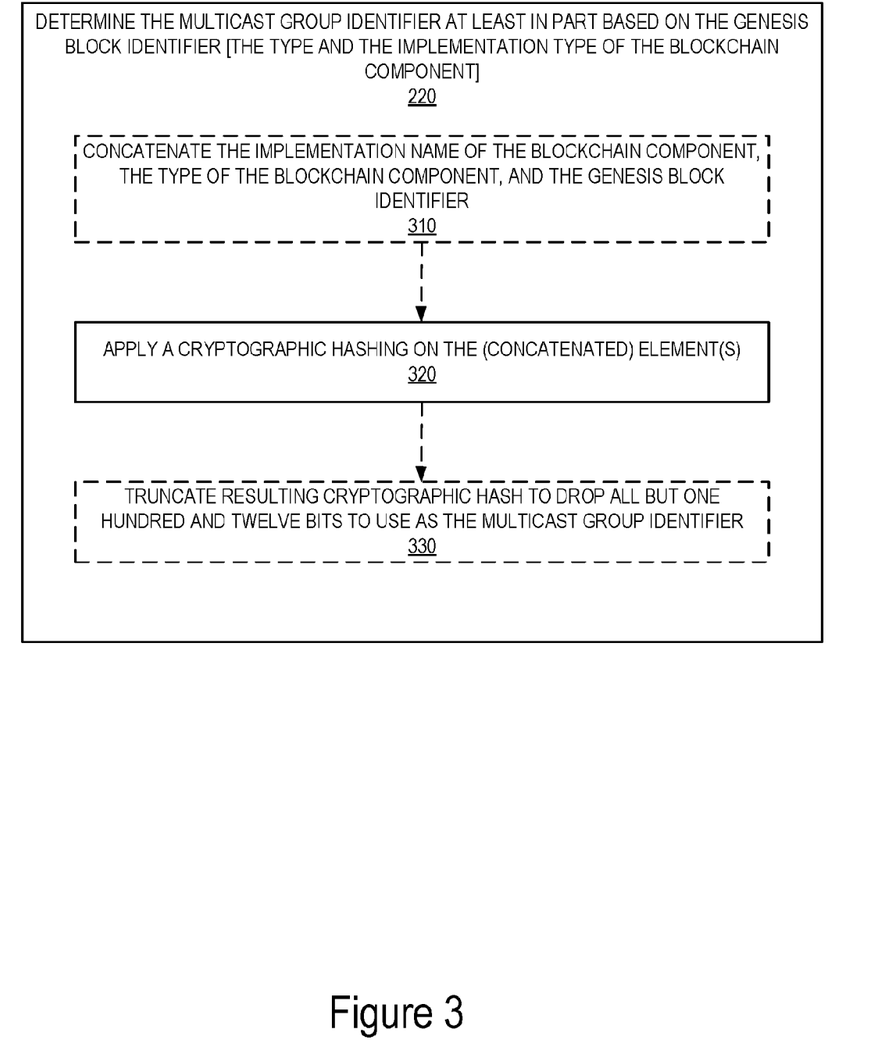
FIG. 3 illustrates a flow diagram of exemplary operations for determining the multicast group identifier, in accordance with some embodiments.
Figure 4:
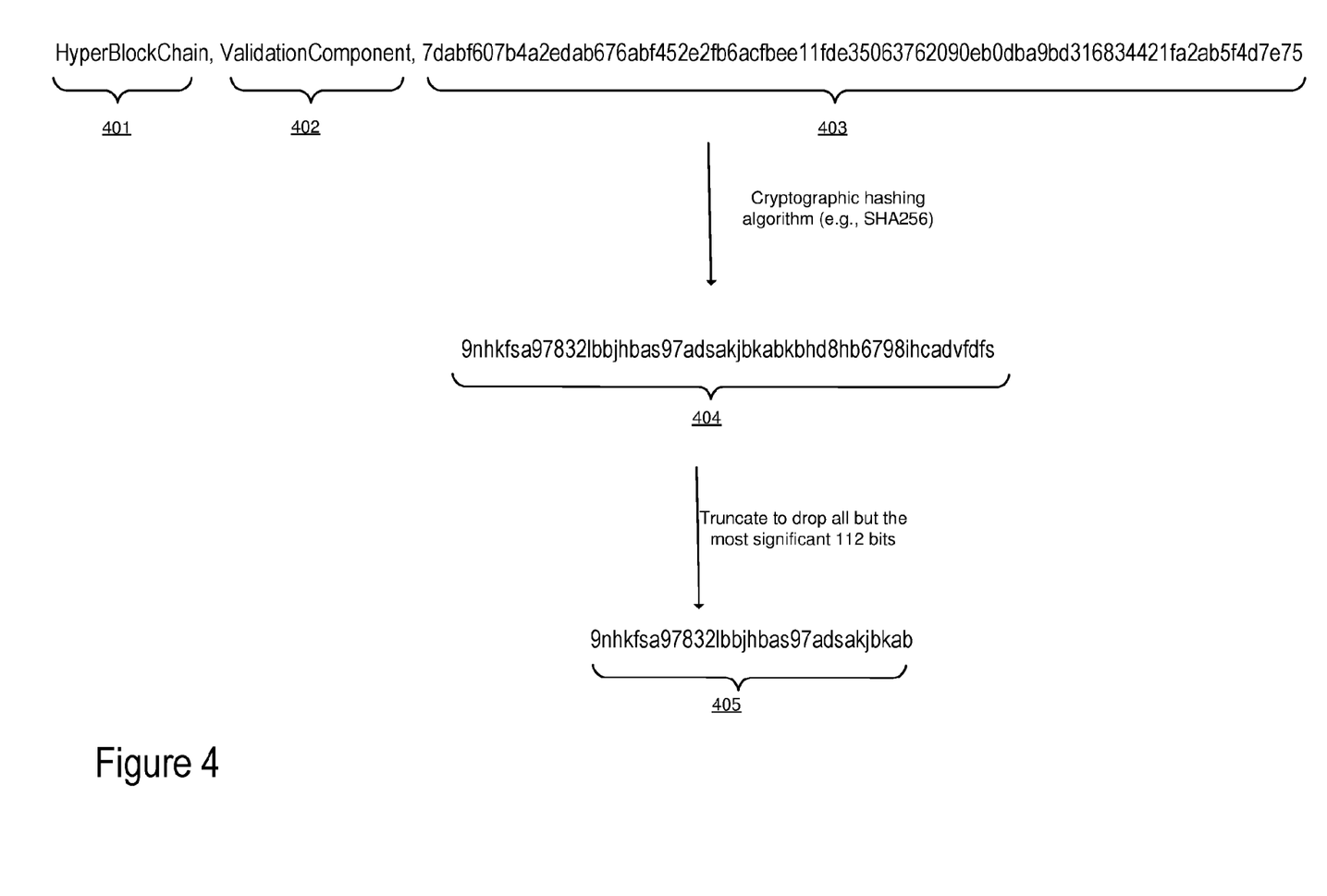
FIG. 4 illustrates exemplary operations for generating an exemplary multicast group identifier, in accordance with some embodiments.

FIG. 3 illustrates a flow diagram of exemplary operations for determining the multicast group identifier in accordance with some embodiments. In a first embodiment, where the type of the blockchain component and the implementation name are used in addition to the genesis block identifier to determine the multicast group identifier, the operations 310-320 are performed. At operation 310, the blockchain component concatenates the name of the implementation of the blockchain component, the type of the blockchain component, and the genesis block identifier for the application specific blockchain. FIG. 4 illustrates exemplary operations for generating an exemplary multicast group identifier. The element 401 "HyperBlockChain" represents an exemplary name of implementation. This element can include varying names of implementation that may be available in the cloud computing system 100. The element 402 "ValidationComponent" represents an exemplary type of blockchain component. This element can include one of the other types of components that are part of the cloud computing system 100 (e.g., transaction processing component or REST API component). The element 403 includes an identifier of the genesis block of the blockchain to which the blockchain component belongs. In some embodiments, the concatenation of elements is in a different order than that illustrated in FIG. 4.

At operation 320, the blockchain component applies a cryptographic hashing on the concatenated elements to obtain a cryptographic hash 404. In some embodiments, if the result of the hashing algorithm is greater than the number of bits that are needed for the multicast group identifier, the cryptographic hash 404 is truncated (operation 330) to obtain the number of bits needed. For example, when the multicast address to be generated is an IPv6 address, the length of the group identifier is 112 bits. The cryptographic hash 404 is then truncated to obtain 112 bits to use as the group identifier of the multicast address. In a non-limiting example, the SHA (Secure Hash Algorithm) is one of a number of cryptographic hash functions that can be used to generate the cryptographic hash 404. For example, SHA-256 algorithm generates an almost-unique, fixed size 256-bit (32-byte) hash from the concatenated elements 401, 402, and 403. The cryptographic hash 404 is truncated by dropping all but the most significant (left most) 112 bits and the result 405 is used as the multicast group identifier.

In other embodiments, the flow of operations moves from operation 210 to operation 220, and the operation 215 is skipped. In these embodiments, the multicast group identifier is determined based on the genesis block identifier (element 403) only. The genesis block identifier is obtained by performing the operation 320 on the genesis block identifier only and by optionally (operation 330) truncating the resulting cryptographic hash if needed.

Referring back to FIG. 2, at operation 205, the multicast address is generated based on the multicast group identifier. The multicast address generated based on the genesis block identifier is a unique multicast address for a blockchain component that is part of a specific blockchain that is identified by the genesis block identifier. For example, when the blockchain component is a validation component (e.g., first component 101A), the multicast address is generated based on the genesis block identifier of the blockchain for which this component handles validation operations. In some embodiments, the multicast address is an IPv6 multicast address. The type of multicast address generated depends on how the blockchain application is deployed. In some embodiments, the multicast address is a link local address for a dense deployment in which each subnet has a separate set of blockchain system components. In other embodiments, the multicast address is a cross-subnet address for a less dense deployment in which a single set of components serves multiple subnets. The type of address can be discovered either dynamically, for example through addition to the DNS TXT record or statically, for example by encoding it as a command line parameter.

Once the blockchain component has generated the multicast address, the flow of operations then moves to operation 225, at which the blockchain component joins the multicast group identified by the multicast group identifier. For example, the Multicast Listener Discovery (MLD) protocol can be used by the blockchain component to join the multicast group. A Multicast Listener Discovery Report protocol message can be sent to the local router informing it that the blockchain component is a multicast listener. Other protocols or mechanisms can be used to enable the blockchain component to join the multicast group.

With reference to FIG. 1, the first component 101A has generated a multicast address based on the genesis block identifier of the blockchain that it serves and joins the multicast group defined by the multicast address.

At operation 230, the blockchain components transmits a message destined to the multicast address. The message includes a request for a unicast address of another component of the blockchain system. In some embodiments, the message can be a Hypertext Transfer Protocol (HTTP) message or alternatively a dedicated service discovery protocol message.

Figure 5:
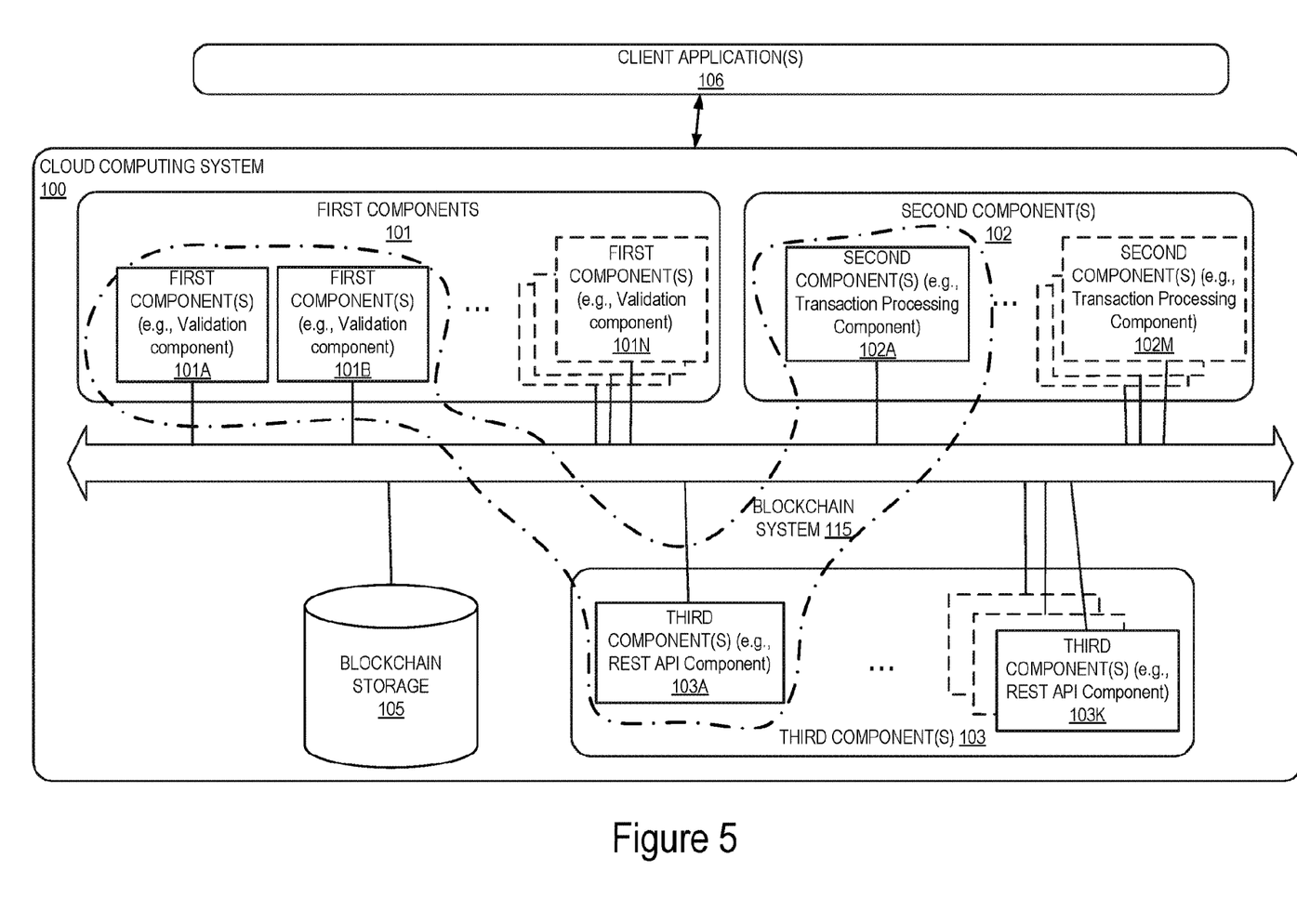
FIG. 5 illustrates a block diagram of an exemplary deployment of blockchain components in a blockchain system, in accordance with some embodiments.

The multicast address can be used to determine whether a component of the same type as the component type used to generate the multicast group identifier of the multicast address is also running for the same blockchain. FIG. 5 illustrates a block diagram of an exemplary deployment of blockchain components in a blockchain system 115, in accordance with some embodiments. The illustrated deployment includes two first components (e.g., two validation components) 101A and 101B, a single second component (transaction processing component) 102A and a single third component (REST API component) 103A. These blockchain components 101A, 101B, 102A, and 103A form a service instance for an application of a second blockchain. The blockchain includes a first genesis block which identifier is used to generate the multicast IP address of the multicast group. The multicast group includes the components 101A, 101B, 102A, and 103A. Each one of the components 101A, 101B, 102A, and 103A has joined the multicast group. The multicast IP address is generated based on a type of a blockchain component (e.g., validation component), an implementation name (e.g., HyperBlockChain) and the genesis block identifier.

Figure 6A:
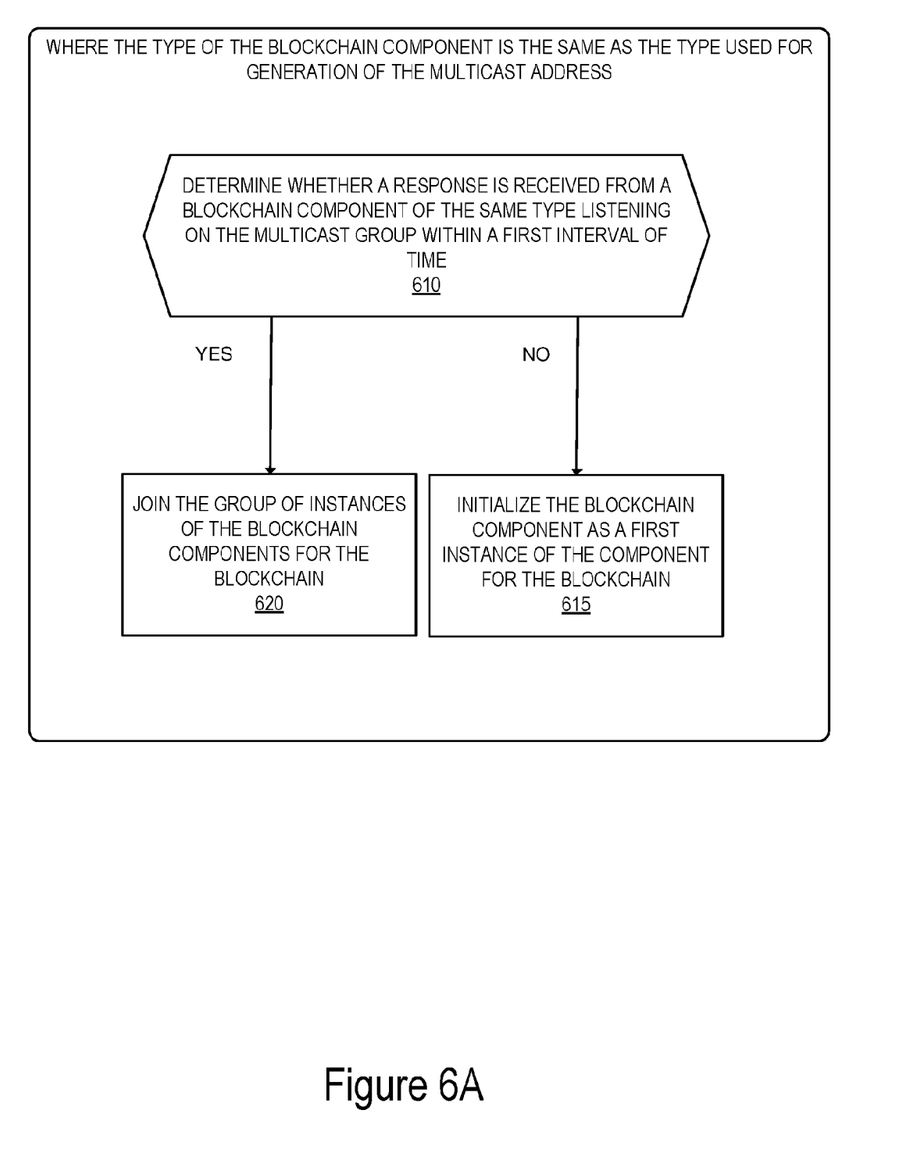
FIG. 6A illustrates a flow diagram of exemplary operations performed when a blockchain component transmits a multicast address constructed with its own type, in accordance with some embodiments.

FIG. 6A illustrates a flow diagram of exemplary operations performed when a blockchain component transmits a multicast address constructed with its own type, in accordance with some embodiments. If the component is transmitting to a multicast address constructed with its own type as type of component, then it is attempting to determine if an existing instance of this particular component is already running for the same blockchain. While the embodiments below will be described with the exemplary blockchain component being a validation component, in other embodiments, the operations described below also apply to other types of blockchain components. When the first component 101A of type validation component boots up, it generates a multicast IP address based on the genesis block identifier, the type of the blockchain component (e.g., validation component), and an implementation name of the blockchain component. The component 101A transmits a message addressed to the generated multicast IP address over the network. The first component 101A determines whether a response is received from a blockchain component of the same type that is listening on the multicast group within a first interval of time (operation 610). If the first component 101A receives a response from the component 101B that is of the same type as that of the first component 101A within that interval of time, this indicates that there is another instance of this type already running for the same blockchain system and therefore the component 101A joins the group of instances (operation 620) of the same blockchain components for that blockchain system. In some embodiments, this can include joining a load balancing mechanism that allows load balancing of operations on the two components 101A and 101B. In some embodiments, if a response is received and a load balancing mechanism is nonexistent in the system, the blockchain component 101A may cause a warning message to be displayed indicating that an error has occurred. If a reply is not received from component 101B or another component of the same type as component 101A, this indicates that the component 101A is the only one active for the blockchain. In this case, the blockchain component 101A initializes (operation 615) as the first instance of the first component (e.g., of type validation component) for the blockchain. The blockchain component binds the service socket and begins accepting requests for the blockchain.

Figure 6B:
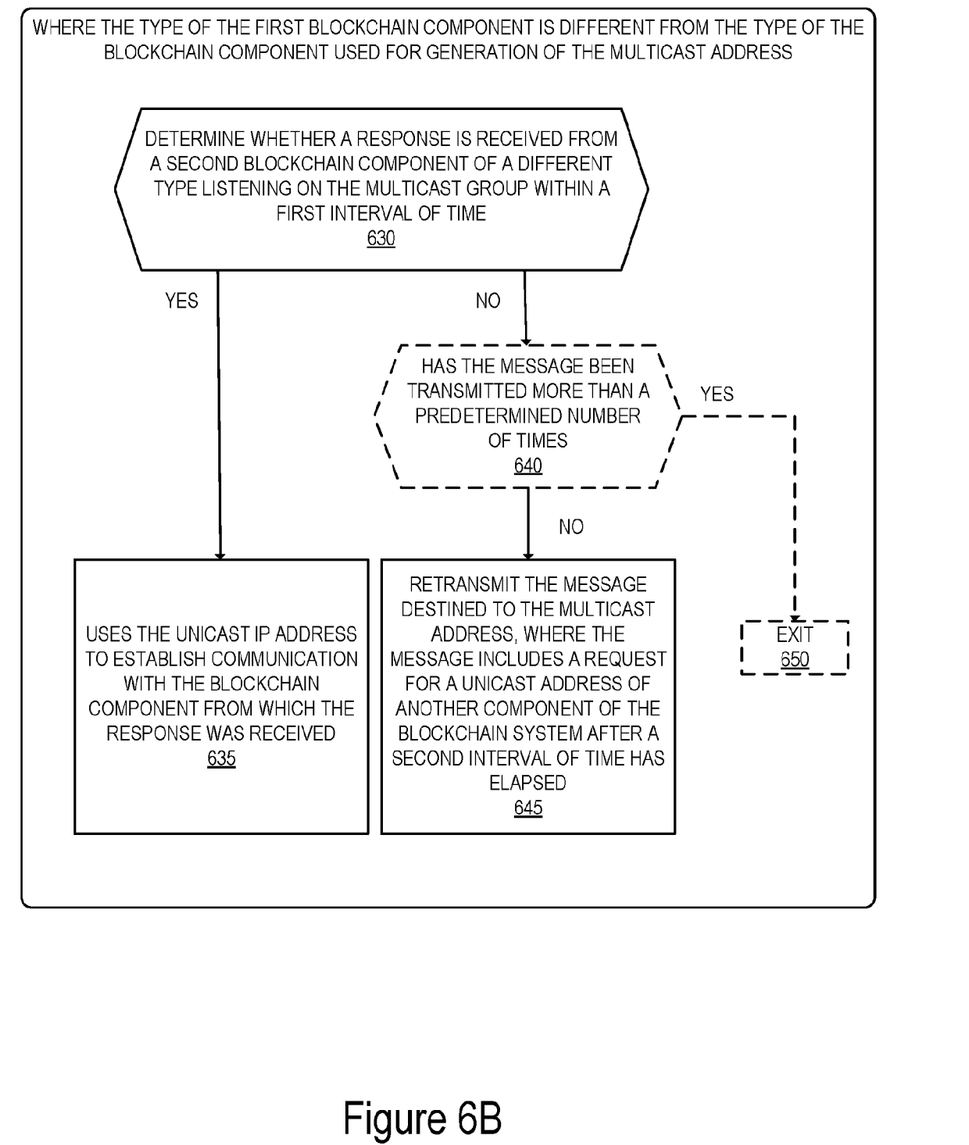
FIG. 6B illustrates a flow diagram of exemplary operations performed when a blockchain component transmits a message to a multicast address constructed with another type other than its own type, in accordance with some embodiments.

FIG. 6B illustrates a flow diagram of operations performed when a blockchain component transmits a message to a multicast address constructed with another type other than its own type, in accordance with some embodiments. Referring back to FIG. 5, the second component (transaction processing) 102A or the third component 103A (REST API component) transmits a message destined to the multicast address constructed based on the type of the first component 101A (validation component) and based on the genesis block identifier. In this example, the second component is looking for a component on which it depends to operate (i.e., it is looking for a dependee). At operation 630, the blockchain component (102A or 103A) determines whether a response is received from a blockchain component of a different type listening on the multicast group within a first interval of time. For example, the blockchain component determines whether a response is received from the first component 101A (validation component) within that interval of time. When a response is received, the response includes the unicast IP address of the blockchain component that is responding (e.g., 101A). At operation 635, the blockchain component receiving the response (e.g., 102A, 103A), uses the unicast IP address to establish communication with the blockchain component from which the response was received. The blockchain component receiving the response (e.g., 102A, 103A) uses the returned unicast address to open a socket to the dependee blockchain component (e.g., 101A). In some embodiments, if no response is received, the operations move to operation 645, at which the blockchain component (e.g., 102A or 103A) retransmits the message destined to the multicast address of another component of the blockchain system after a second interval of time has elapsed. In some embodiments, the second interval of time can be determined randomly. For example, a pseudo-random generator can be used to generate a number n, between [0,X] seconds (or milliseconds, or another time unit etc.) and the blockchain component retransmits the request every n seconds. This enables the dependee blockchain component to respond to the request after the second interval of time has elapsed (e.g., the dependee can be in the process of booting up when the first request is transmitted and has completed the boot-up when the second request is sent). In some embodiments, the blockchain component (e.g., 102A, 103A) may only retransmit the message including the request a predetermined number of times before concluding that no instance of the dependee blockchain component is available on the multicast network. This may be accomplished by looping (not illustrated) operation 645 back to operation 630. In these embodiments, instead of retransmitting the message at operation 645, the blockchain component determines, at operation 640, whether the message has been transmitted more than the predetermined number of times. If the message has not been transmitted more than the predetermined number of times, the operations move to operation 645, at which the message is retransmitted. Alternatively, if the message has been transmitted more than the predetermined number of times, the operations move to operation 650, at which the process is exited. In some embodiments, the component stops transmitting messages and may cause an alert indicating an error in the deployment of the blockchain system.

In an exemplary embodiment, each blockchain component of the blockchain system 115 (e.g., first blockchain component 101A-101B, second blockchain component 102A, and third blockchain component 103A) is operative to generate a single multicast address based on the genesis block identifier and a single type of blockchain component. For example, the type of blockchain component used for generating the single multicast address can be a dependee, i.e., a blockchain component on which the other types of components depend. In the exemplary implementation of FIG. 5, the validation component is a dependee on which each of the transaction processing component and the REST API component depend. Thus, the multicast address is generated as described with reference to FIG. 3 and operations 310, 320 and 330. In this embodiment, when one of the blockchain components (101A, 101B, 102A, and 103A) is initialized, the operations of FIG. 2 are performed, such that each one of the blockchain components generates the multicast address, joins the multicast group and transmits the message over the network. Each of the other blockchain components that are part of the multicast group will receive the message and respond with their unicast IP address. This enables each one of the components to find the dependee (the validation component 101A) and the validation component 101A to discover the redundant validation component 101B.

The embodiments described herein enable blockchain components of a blockchain system that serve a given application building a blockchain to dynamically discover other components of the system and self-assemble without having to hard code specific IP addresses of the blockchain components into the command line by using a multicast address. The multicast address is generated based at least in part on the genesis block of the blockchain. This considerably simplifies the deployment of blockchains for multiple applications in a cloud computing facility, since the IP addresses of the various components can be determined at run time rather than having to be written into configuration scripts. In some embodiments, the multicast address enables blockchain components (e.g., API Rest component and a transaction-processing component) that are dependent on another blockchain component (dependee, e.g., validation component) to find the dependee at run time. The multicast address further enables each component to determine if there is another instance of the same type running on the network.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7:
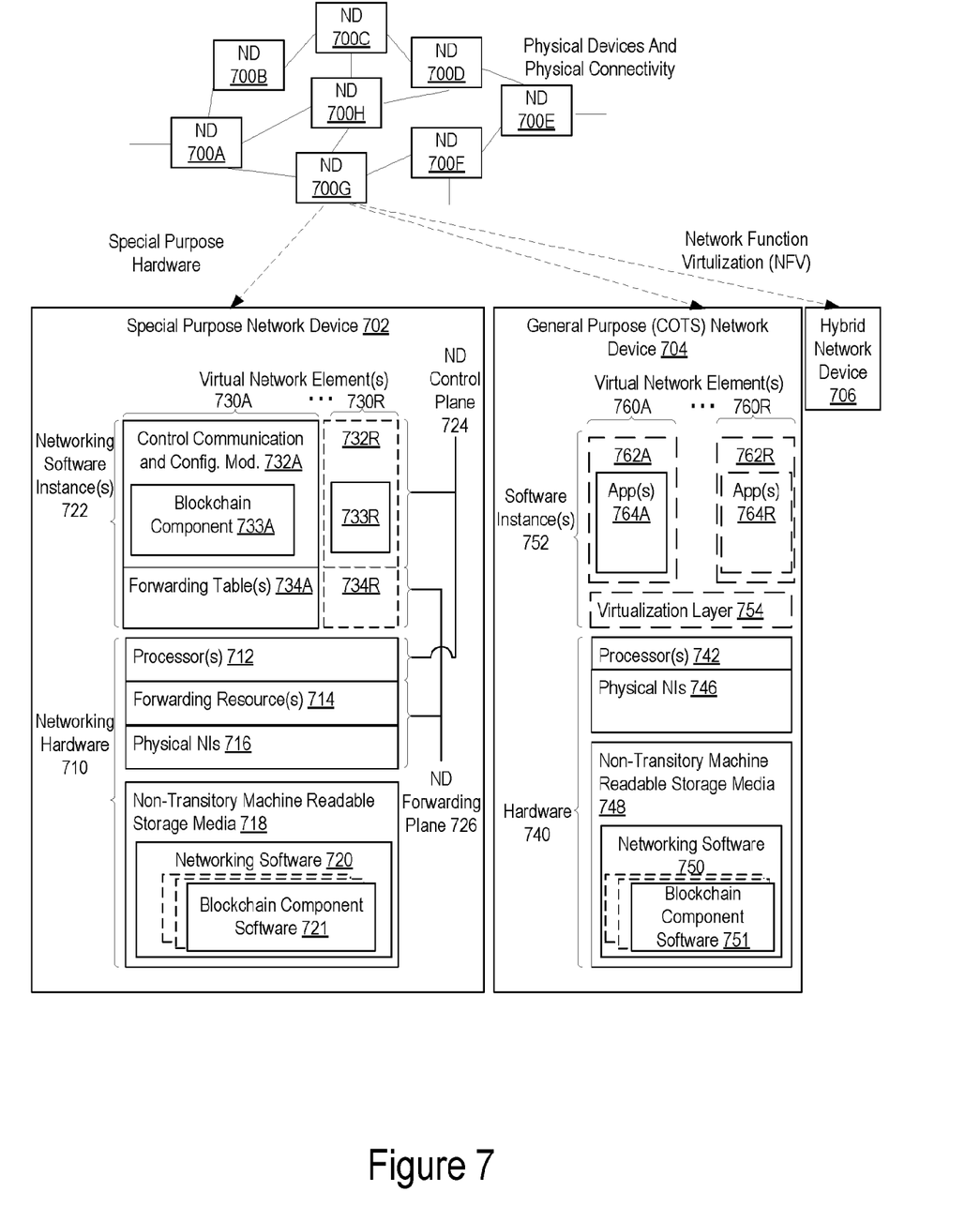
FIG. 7 illustrates connectivity between network devices (NDs) within an exemplary network, as well as three exemplary implementations of the NDs, according to some embodiments of the invention.

FIG. 7 illustrates connectivity between network devices (NDs) within an exemplary network, as well as three exemplary implementations of the NDs, according to some embodiments of the invention. FIG. 7 shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs). In some embodiments, these NDs are part of a cloud-computing system that include the components of the cloud computing system 100 of FIG. 1.

Two of the exemplary ND implementations in FIG. 7 are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. The networking software 720 includes one or more blockchain component software(s) 721. During operation, the networking software 720 may be executed by the networking hardware 710 to instantiate a set of one or more networking software instance(s) 722 that includes the blockchain component(s) 733. The blockchain components can be of different types (e.g., validation component, transaction processing component, or RESP API component, or another type of blockchain component) and may be part of a blockchain system. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 that includes a blockchain component software 751 to instantiate one or more sets of one or more applications 764A-R. The blockchain components can be of different types (e.g., validation component, transaction processing component, REST API component, etc.) and may be part of a blockchain system. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network device of a cloud computing system, including a first blockchain component that is one of a plurality of blockchain components forming a blockchain system, of dynamic discovery of another blockchain component of the blockchain system, the method comprising:

determining a genesis block identifier that uniquely identifies a blockchain serviced by the blockchain system;
determining a multicast group identifier based on at least in part on the genesis block identifier;
generating a multicast address including the multicast group identifier;
joining a multicast group identified by the multicast group identifier; and
transmitting a message destined to the multicast address, wherein the message includes a request for a unicast address of another component of the blockchain system.

2. The method of claim 1, wherein generating the multicast address includes:
determining a type of a blockchain component and an implementation name of a blockchain component; and
wherein determining the multicast group identifier is further based on the type of the blockchain component and the implementation name of the blockchain component.

3. The method of claim 2, wherein determining the multicast group identifier based at least in part on the genesis block identifier further includes:
concatenating the implementation name of the blockchain component, the type of the blockchain component and the genesis block identifier to obtain concatenated elements;
applying a cryptographic hashing on the concatenated elements to obtain a cryptographic hash; and
truncating the cryptographic hash to drop all but one hundred and twelve bits to use as the multicast group identifier.

4. The method of claim 2, wherein the type of the first blockchain component is the same as the type of the blockchain component used for generation of the multicast address, and the method further comprises:
determining whether a response is received from a second blockchain component within a first interval of time, wherein the second blockchain component is of a same type as that of the first blockchain component;
responsive to determining that the response is received within the first interval of time, joining a group of instances of blockchain components of the type of the first blockchain component; and
responsive to determining that the response is not received within the first interval of time, initializing the blockchain component as a first instance of the blockchain component of the blockchain system.

5. The method of claim 2, wherein the type of the first blockchain component is different from the type of the blockchain component used for generation of the multicast address, and the method further comprises:
determining whether a response is received from a second blockchain component within a first interval of time, wherein the second blockchain component is of a different type than that of the first blockchain component;
responsive to determining that the response is received within the first interval of time, using a unicast Internet Protocol address included in the response to establish communication with the blockchain component from which the response was received; and
responsive to determining that the response is not received within the first interval of time, retransmitting the message destined to the multicast address after a second interval of time has elapsed.

6. A network device in a cloud computing system, including a first blockchain component that is one of a plurality of blockchain components forming a blockchain system, for dynamic discovery of another blockchain component of the blockchain system, the network device comprising:
a non-transitory computer readable medium to store instructions;
a processor coupled with the non-transitory computer readable medium to process the stored instructions to:
determine a genesis block identifier that uniquely identifies a blockchain serviced by the blockchain system;
determine a multicast group identifier based on at least in part on the genesis block identifier;
generate a multicast address including the multicast group identifier;
join a multicast group identified by the multicast group identifier; and
transmit a message destined to the multicast address, wherein the message includes a request for a unicast address of another component of the blockchain system.

7. The network device of claim 6, wherein to generate the multicast address further includes:
determine a type of a blockchain component and an implementation name of a blockchain component; and
wherein to determine the multicast group identifier is further based on the type of the blockchain component and the implementation name of the blockchain component.

8. The network device of claim 7, wherein to determine the multicast group identifier based at least in part on the genesis block identifier further includes to:
concatenate the implementation name of the blockchain component, the type of the blockchain component and the genesis block identifier to obtain concatenated elements;
apply a cryptographic hashing on the concatenated elements to obtain a cryptographic hash; and
truncate the cryptographic hash to drop all but one hundred and twelve bits to use as the multicast group identifier.

9. The network device of claim 7, wherein the type of the first blockchain component is the same as the type of the blockchain component used for generation of the multicast address, and the processor is further to:
determine whether a response is received from a second blockchain component within a first interval of time, wherein the second blockchain component is of a same type as that of the first blockchain component;
responsive to determining that the response is received within the first interval of time, join a group of instances of blockchain components of the type of the first blockchain component; and
responsive to determining that the response is not received within the first interval of time, initialize the blockchain component as a first instance of the blockchain component of the blockchain system.

10. The network device of claim 7, wherein the type of the first blockchain component is different from the type of the blockchain component used for generation of the multicast address, and the processor is further to:
determine whether a response is received from a second blockchain component within a first interval of time, wherein the second blockchain component is of a different type than that of the first blockchain component;

responsive to determining that the response is received within the first interval of time, use a unicast Internet Protocol (IP) address included in the response to establish communication with the blockchain component from which the response was received; and responsive to determining that the response is not received within the first interval of time, retransmit the message destined to the multicast address after a second interval of time has elapsed.

11. A non-transitory computer readable storage medium that provide instructions, which when executed by a processor of a network device in a cloud computing system, including a first blockchain component that is one of a plurality of blockchain components forming a blockchain system, cause said processor to perform operations comprising:

determining a genesis block identifier that uniquely identifies a blockchain serviced by the blockchain system;

determining a multicast group identifier based on at least in part on the genesis block identifier;

generating a multicast address including the multicast group identifier;

joining a multicast group identified by the multicast group identifier; and transmitting a message destined to the multicast address, wherein the message includes a request for a unicast address of another component of the blockchain system.

12. The non-transitory computer readable storage medium of claim 11, wherein generating the multicast address further includes:

determining a type of a blockchain component and an implementation name of a blockchain component; and wherein determining the multicast group identifier is further based on the type of the blockchain component and the implementation name of the blockchain component.

13. The non-transitory computer readable storage medium of claim 12, wherein determining the multicast group identifier based at least in part on the genesis block identifier further includes:

concatenating the implementation name of the blockchain component, the type of the blockchain component and the genesis block identifier to obtain concatenated elements;

applying a cryptographic hashing on the concatenated elements to obtain a cryptographic hash; and truncating the cryptographic hash to drop all but one hundred and twelve bits to use as the multicast group identifier.

14. The non-transitory computer readable storage medium of claim 12, wherein the type of the first blockchain component is the same as the type of the blockchain component used for generation of the multicast address, and the operations further comprise:

determining whether a response is received from a second blockchain component within a first interval of time, wherein the second blockchain component is of a same type as that of the first blockchain component;

responsive to determining that the response is received within the first interval of time, joining a group of instances of blockchain components of the type of the first blockchain component; and responsive to determining that the response is not received within the first interval of time, initializing the blockchain component as a first instance of the blockchain component of the blockchain system.

15. The non-transitory computer readable storage medium of claim 12, wherein the type of the first blockchain component is different from the type of the blockchain component used for generation of the multicast address, and the operations further comprise:

determining whether a response is received from a second blockchain component within a first interval of time, wherein the second blockchain component is of a different type than that of the first blockchain component;

responsive to determining that the response is received within the first interval of time, using a unicast Internet Protocol (IP) address included in the response to establish communication with the blockchain component from which the response was received; and responsive to determining that the response is not received within the first interval of time, retransmitting the message destined to the multicast address after a second interval of time has elapsed.

\* \* \* \* \*